United States Patent [19]
Horning

[11] Patent Number: 5,414,861
[45] Date of Patent: May 9, 1995

[54] DATA PROTECTION SYSTEM USING DIFFERENT LEVELS OF RESERVE POWER TO MAINTAIN DATA IN VOLATILE MEMORIES FOR ANY PERIOD OF TIME

[75] Inventor: Randall Horning, Longmont, Colo.

[73] Assignee: Fujitsu Limited, Kawasaki, Japan

[21] Appl. No.: 759,412

[22] Filed: Sep. 11, 1991

[51] Int. Cl.$^6$ ............... G06F 15/56; G06F 1/00
[52] U.S. Cl. .................. 395/750; 364/492; 364/273; 364/273.1; 364/273.2; 364/948.5; 364/948.6; 364/948.7; 364/DIG. 2; 395/575
[58] Field of Search ............... 395/750, 575; 364/DIG. 1, 492; 365/229

[56] References Cited

U.S. PATENT DOCUMENTS

| | | | |
|---|---|---|---|
| 3,980,935 | 9/1976 | Worst | 365/229 |
| 4,327,410 | 4/1982 | Patel et al. | 395/425 |
| 4,375,663 | 3/1983 | Arcara et al. | 395/750 |
| 4,412,284 | 10/1983 | Kerforne et al. | 364/200 |
| 4,422,163 | 12/1983 | Oldenkamp | 365/229 |
| 4,458,307 | 7/1984 | McAnlis et al. | 395/575 |
| 4,463,270 | 7/1984 | Gordon | 307/296 |
| 4,523,295 | 6/1985 | Zato | 364/900 |
| 4,525,800 | 6/1985 | Hameria | 395/575 |
| 4,611,289 | 9/1986 | Coppola | 364/492 |
| 4,677,311 | 6/1987 | Morita | 307/66 |
| 4,698,748 | 10/1987 | Juzswik et al. | 395/750 |
| 4,698,808 | 10/1987 | Ishii | 371/21.5 |
| 4,747,041 | 5/1988 | Engel et al. | 395/750 |
| 4,763,333 | 8/1988 | Byrd | 371/66 |
| 4,800,532 | 1/1989 | Honeck et al. | 365/226 |
| 4,874,960 | 10/1989 | Cybela | 307/64 |
| 4,878,196 | 10/1989 | Rose | 364/900 |
| 4,907,150 | 3/1990 | Arroyo et al. | 395/575 |
| 4,907,183 | 3/1990 | Tanaka | 364/707 |
| 4,980,836 | 12/1990 | Carter et al. | 364/483 |
| 5,018,148 | 5/1991 | Patel et al. | 371/66 |
| 5,025,387 | 6/1991 | Frane | 364/493 |
| 5,121,359 | 6/1992 | Steele | 365/229 |
| 5,136,327 | 8/1992 | Ogawa | 354/484 |
| 5,157,711 | 10/1992 | Shimanuki | 379/67 |
| 5,163,153 | 11/1992 | Cole et al. | 395/750 |
| 5,167,024 | 11/1992 | Smith et al. | 395/375 |
| 5,182,769 | 1/1993 | Yamaguchi et al. | 379/387 |
| 5,204,963 | 4/1993 | Noya et al. | 395/750 |
| 5,218,704 | 6/1993 | Wahs, Jr. et al. | 395/750 |
| 5,237,698 | 8/1993 | Ohmae | 395/750 |
| 5,241,508 | 8/1993 | Berenguel et al. | 365/229 |

*Primary Examiner*—Alyssa H. Bowler
*Assistant Examiner*—Meng-Ai T. An
*Attorney, Agent, or Firm*—James R. Young; Robert G. Crouch; Chrisman, Bynum & Johnson

[57] ABSTRACT

An intelligent data protection system includes a memory refreshing apparatus and a memory access apparatus connected to the volatile memory array of a computer system for maintaining the integrity of the data contained therein and allowing the main computer system to access data. Control apparatus follows a user programmable power control sequence to selectively provide power to various components and to initiate the transfer of data into a non-volatile memory. Initially, the control apparatus provides power from a reserve power supply to the volatile memory, the memory maintenance apparatus, and the memory access apparatus immediately upon detecting a power failure. If the power is not restored within a predetermined time, the control apparatus removes power from all non-essential components, including the memory access apparatus, to minimize the power consumed by the data protection system while still maintaining the data in the volatile memory. The data protection system also includes data transfer apparatus to transfer data from the volatile memory into a non-volatile memory upon command from the control apparatus.

26 Claims, 9 Drawing Sheets

DATA PROTECTION SYSTEM USING DIFFERENT LEVELS OF RESERVE POWER TO MAINTAIN DATA IN VOLATILE MEMORIES FOR ANY PERIOD OF TIME

BACKGROUND OF THE INVENTION

1. Field of the Invention

This invention relates to data protection systems for computer systems in general, and more particularly to a data protection system having user programmable power sequences to efficiently manage the limited power available from a reserve power supply.

2. Brief Description of the Prior Art

Almost without exception, most currently used computer systems, from the smallest microprocessor operated devices on up to the large, so-called "main frame" computer systems, rely at least to some extent on volatile memory arrays to temporarily store data being processed. Such memory arrays are referred to as "volatile," because they require constant electrical power to retain data. If electrical power to the memory array is interrupted as a result of a power failure or a failure of the memory power supply, the data stored in the memory will be lost.

A common type of volatile memory array used by such computer systems is the so-called Dynamic Random Access Memory, or DRAM. DRAM memory arrays are used in a wide variety of computer memory devices, such as RAM memory arrays, memory caching systems, and solid state disk drive systems, because they are relatively compact and inexpensive and can store large amounts of data. One characteristic of such Dynamic Random Access Memories (DRAMs) is that they need to be periodically "refreshed" (i.e., electrically recharged) every few milliseconds to retain data over extended periods of time. Therefore, Dynamic Random Access Memory arrays require suitable hardware refreshing apparatus to provide such periodic data refreshment. Unfortunately, if the electrical power to the DRAM array and the data refreshing apparatus is interrupted, even momentarily, the data stored in the DRAM array will be lost forever and must be replaced or reconstructed before computer operations can resume.

Since such data replacement or reconstruction tends to be relatively difficult and time consuming, and may even be impossible in some circumstances, numerous data protection systems have been devised to help prevent data loss during various types of long and short term power failures or surges that would otherwise result in a partial or total loss of the data stored in such volatile memory arrays. Examples of such data protection systems are shown in U.S. Pat. No. 3,980,935 issued to Worst; U.S. Pat. No. 4,327,410 issued to Patel et al.; U.S. Pat. No. 4,375,663 issued to Arcara et at.; U.S. Pat. No. 4,458,307 issued to McAnlis et at.; U.S. Pat. No. 4,525,800 issued to Hameria; U.S. Pat. No. 4,677,311 issued to Morita; U.S. Pat. No. 4,698,808 issued to Ishii; U.S. Pat. No. 4,763,333 issued to Byrd; U.S. Pat. No. 4,800,532 issued to Honeck et at.; U.S. Pat. No. 4,874,960 issued to Cybela; and U.S. Pat. No. 4,907,150 issued to Arroyo et al.

Most of the existing data protection systems, such as those listed above, can be grouped into one of two categories or classifications depending on the particular data saving strategy that is utilized. Data protection systems falling into the first category (hereinafter referred to as category I systems) typically rely on relatively large capacity storage batteries in the reserve power supplies to continually supply power to the volatile memory arrays and memory refreshing apparatus until the main power is restored. In contrast, data protection systems falling into the second category (hereinafter referred to as category II systems) usually include memory transfer apparatus in addition to the data refreshing apparatus to transfer data from the volatile memory arrays into non-volatile memory arrays (i.e., memory arrays that can retain data without power) upon detecting power failures.

Unfortunately, a major drawback associated with the category I data protection systems is that if the main power remains interrupted for a long period of time, the reserve power supplies (usually comprising conventional storage batteries) may be exhausted, resulting in a complete loss of data. One way to circumvent this problem has been to provide relatively large capacity backup batteries in the reserve power supplies to extend the time that the systems can preserve data in the volatile memory array. However, such large reserve batteries require large capacity battery chargers and associated components, which increase the overall costs, complexities, and sizes of such data protection systems. Furthermore, most category I systems rely on the reserve power supply to supply power to the entire computer system, including the main processor and any peripheral devices, thereby substantially increasing the power demands placed on the reserve power supply. Therefore, regardless of the size of the battery in the reserve power supply, there is always a chance that the battery will be exhausted before the main power is restored, resulting in a complete loss of data.

Another disadvantage associated with category I systems is that the reserve power supplies are only used on rare occasions, since power outages or failures of the main power supplies are relatively infrequent. Therefore, it is simply not efficient to provide large capacity reserve power supplies when such supplies are infrequently required. Unfortunately, reducing the capacities of the components of such reserve power supplies to make their costs acceptable introduces the problem of limiting the amount of time that the data protection systems can compensate for power interruptions.

The category II data protection systems were developed in response to the shortcomings associated with the category I systems described above. Most of the category II data protection systems immediately transfer data stored in the volatile computer memories into a non-volatile memory as soon as a power interruption is detected. Since the volatile memory arrays and the data protection system need only be energized during the time necessary to transfer the data to the non-volatile memory, much smaller reserve batteries can be used in the reserve power supply without compromising the ability of the data protection system to preserve data. Accordingly, category II data protection systems have tended to be effective in reducing the sizes of the reserve battery systems, because the power consuming volatile memory arrays only require power until the data stored therein can be transferred into non-power consuming non-volatile memory arrays. As soon as all the data are transferred by such a system, the entire data protection system is then usually shut down.

An example of such a category II data protection system is described in the patent issued to Byrd (U.S.

Pat. No. 4,763,333). Essentially, Byrd discloses a data protection system for PC-type computers which saves the data stored in various volatile memory arrays in the computer into a non-volatil. e memory, such as a magnetic disk, as soon as a power interruption is detected. Byrd accomplishes this data protection function by immediately connecting the reserve power supply to the CPU and the volatile memory array (RAM), as well as to all the other devices connected to the CPU, to preserve the data in the volatile memories associated with these devices. Byrd's system then transfers all data stored in the respective volatile memories of such devices, including the CPU state, operating system, application program, and user data, into the non-volatile memory. When power is restored, Byrd's data protection system then transfers the data from the non-volatile memory array back into the respective volatile memory arrays from which the data originated, thereby restoring the PC to the exact state in which it was before the power failed, right down to the cursor position on the screen.

While the system disclosed by Byrd is useful in many circumstances, it is not without drawbacks. For example, while Byrd's system is suitable for relatively small, low power consuming computers, such as PCs, it cannot be effectively adapted for use in a larger, main frame computer, because of the enormous power loads that would be placed on the reserve batteries by the large central processor and volatile memory arrays, not to mention the numerous high power consuming peripheral devices, such as solid state disks, that are commonly connected to such a large computer system. Providing a large enough reserve power supply to energize these components, even for a short time according to the teachings of Byrd, is just not practical.

Another problem associated with the data protection system according to Byrd is that there is no convenient means of stopping the data transfer process if power is restored to the system during the time the data are being transferred from the volatile memory arrays into the non-volatile memory, such as would occur in relatively common, but momentary power outages lasting only a few seconds or minutes. With Byrd's system, the user must wait until the data protection system transfers all the data into the non-volatile memory and back into the volatile memories before computer operation can be resumed. While this delay is not a problem for small PCs, since the amount of data being handled is relatively small and can be quickly transferred, it is impractical on large computer systems since the amount of data being handled is many orders of magnitude larger. Further, if such a large computer system needs to be briefly shut down to service a piece of equipment, the users will have to wait for Byrd's data recovery sequence to be completed before they can use the system.

Therefore, there is a need for a data protection system that can be effectively used with larger, high power consuming computer systems that include relatively large volatile RAM arrays, solid state disks, data caching systems, and the like, while only requiring a relatively small reserve battery to ensure data protection. Such a data protection system should be capable of temporarily powering the volatile memory arrays to allow the computer system to be rapidly restored to operation following short power outages, and yet ensure full data integrity by storing the data in non-volatile memory in the event the power failure is of long duration. Ideally, such a data protection system should have a user configurable power sequence to allow the user to tailor the operation of the system depending on the size of the reserve battery utilized and should have a user selectable recovery option to allow the user to select whether the data transfer process will be completed if power is restored during that process. Until this invention, no such data protection system existed.

SUMMARY OF THE INVENTION

Accordingly, it is a general object of this invention to provide an improved data protection system that more efficiently utilizes the limited energy stored in the reserve power supply.

It is another object of this invention to provide an improved data protection system that can maintain the data stored in the volatile memory system in an on-line state during short duration power outages.

It is a further object of this invention to provide an improved data protection system that will automatically minimize the power load placed on the reserve power supply in accordance with a power control sequence.

It is yet a further object of this invention to automatically transfer data to a non-volatile memory only when the reserve power supply can no longer maintain data in an on-line state.

It is still another object of this invention to provide an improved data protection system for quickly and accurately restoring data to the volatile memory if the power returns during the time when data are being transferred to the non-volatile memory.

It is a more specific object of this invention to provide an improved data protection system having a user programmable power control sequence.

Additional objects, advantages and novel features of the invention shall be set forth in part in the description that follows, and in part will become apparent to those skilled in the art upon examination of the following or may be learned by the practice of the invention. The objects and the advantages of the invention may be realized and attained by means of the instrumentalities and in combinations particularly pointed out in the appended claims.

To achieve the foregoing and other objects and in accordance with the purpose of the present invention, as embodied and broadly described herein, the intelligent data protection system of this invention includes a memory refreshing apparatus and a memory access apparatus connected to the volatile memory array of a computer system for maintaining the integrity of the data contained therein and allowing the main computer system to access data. Control apparatus follows a user programmable power control sequence to selectively provide power to various components and to initiate the transfer of data into a non-volatile memory. Initially, the control apparatus provides power from a reserve power supply to the volatile memory, the memory maintenance apparatus, and the memory access apparatus immediately upon detecting a power failure. If the power is not restored within a predetermined time, the control apparatus removes power from all non-essential components, including the memory access apparatus, to minimize the power consumed by the data protection system while still maintaining the data in the volatile memory. The data protection system also includes data transfer apparatus to transfer data from the volatile memory into a non-volatile memory upon command from the control apparatus.

The method of the intelligent data protection system of this invention includes the steps of monitoring the memory power supply and selectively supplying reserve power from a reserve power supply to the volatile memory, the memory refreshing apparatus, the memory access apparatus, and the non-volatile memory in accordance with the user programmable power control sequence.

BRIEF DESCRIPTION OF THE DRAWINGS

The accompanying drawings, which are incorporated herein and form a part of the specification illustrate preferred embodiments of the present invention, and together with the description, serve to explain the principles of the invention. In the drawings.

DETAILED DESCRIPTION OF THE PREFERRED EMBODIMENT

Figure 1:
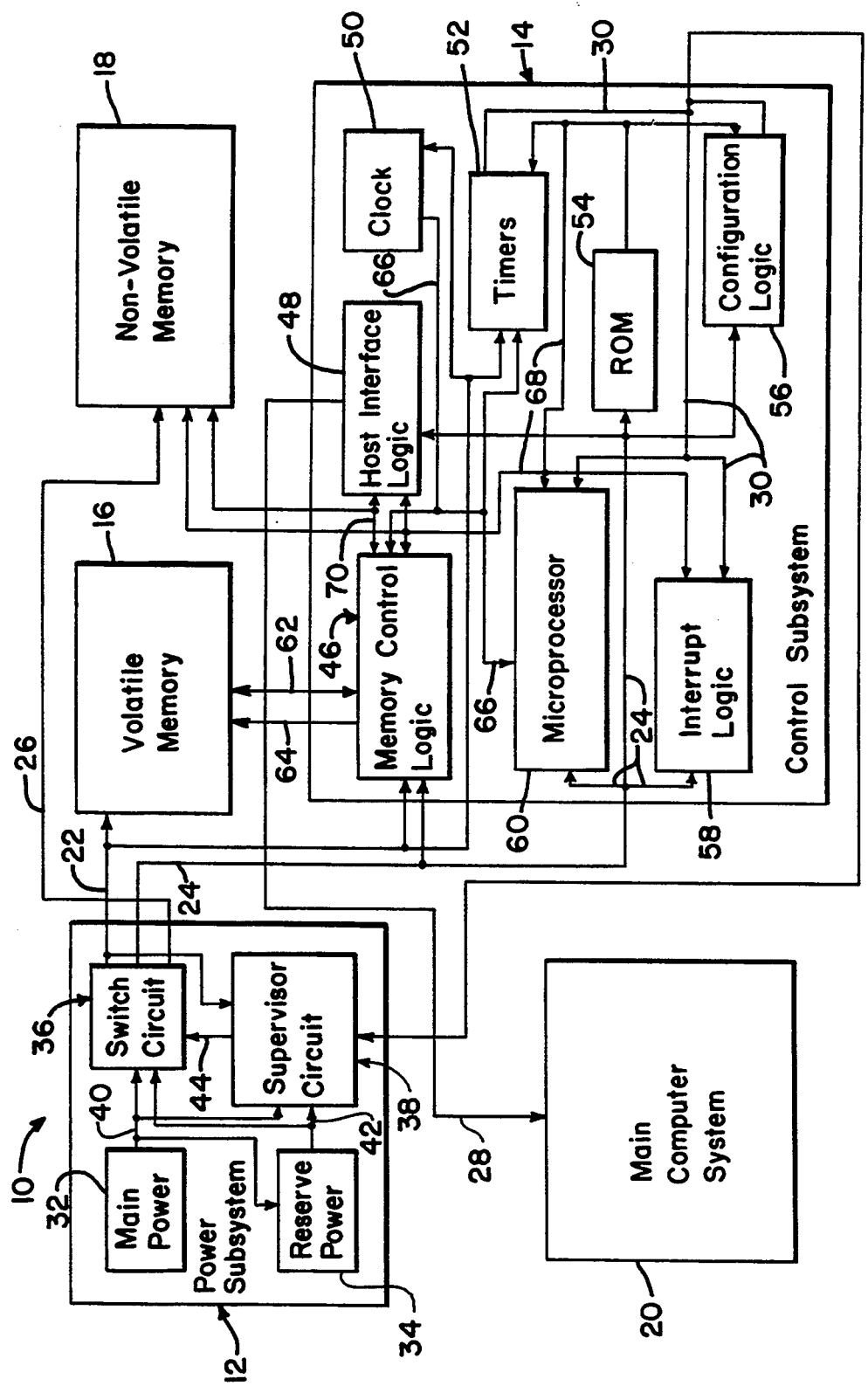
FIG. 1 is a schematic block diagram of the intelligent data protection system according to the present invention showing the major components in the power subsystem and control subsystem and how those components are connected to the volatile memory array, the non-volatile memory array, and to the main computer system.

The intelligent data protection system 10 according to the present invention is shown in FIG. 1 and generally comprises a power subsystem 12 and a control subsystem 14 that are connected to each other and to a volatile memory 16, a non-volatile memory 18, and a main computer system 20. In the preferred embodiment, the volatile memory 16 is a solid state disk drive (SSD) of the type commonly used to temporarily store large amounts of frequently accessed data to allow rapid access thereto by the computer system 20. Accordingly, the following description is directed to a data protection system for protecting data stored in such a volatile SSD memory system. However, it should be understood that the data protection system 10 according to the present invention could be used just as easily with a wide variety of volatile memory arrays, such as those found in memory caching systems or RAM (random access memory) systems, with only minor changes that would be obvious to persons having ordinary skill in this art depending on the particular configuration of the volatile memory array and after having become familiar with this invention. Therefore, while the following description is directed to a data protection system for use with a SSD, the present invention should not be regarded as limited to use only with SSD memory systems.

In the preferred embodiment, the power subsystem 12 supplies power to certain selected portions of the control subsystem 14, the volatile memory array 16 of the solid state disk drive system (not shown), and the non-volatile or back-up memory array 18 via primary, secondary, and tertiary power conductors 22, 24, and 26, respectively, and in accordance with a power control sequence 72 (FIG. 2), as will be described in detail below. A microprocessor 60 in the control subsystem 14 controls the operation of the various components of the data protection system 10.

During normal computer operation, power supplied by the main power supply 32 passes through switch circuit 36 which directs the power to the volatile memory 16 and the control subsystem 14 via primary and secondary power conductors 22 and 24. Note that the tertiary power conductor 26, which supplies power to the non-volatile memory 18 is not energized at this time. During such normal computer operation, the data protection system 10 constantly monitors the electrical power supplied by the main power supply 32 for interruptions caused by either an interruption of the AC power to the main power supply 32 or by the failure of some component within the main power supply 32 itself. When such an interruption is detected, the supervisor circuit 38 immediately directs the switch circuit 36 to connect the reserve power supply 34 to the primary and secondary power lines 22 and 24, thereby preventing data loss.

As was briefly mentioned above, and as will be described in detail below, the microprocessor 60 now directs the operation of the data protection system 10 in accordance with the predetermined power control sequence 72 shown in FIG. 2. Essentially, this power control sequence 72 includes three power load sequences 74, 76, and 78, that are sequentially activated depending on the amount of time that has passed since the power loss occurred and on certain other factors that will be described below. Immediately following a power loss, the power load 74 on the reserve power supply is the same as that placed on the main power supply 32 before the power loss occurred, i.e., the primary and secondary power conductors 22 and 24, respectively, remain energized. During this power load sequence 74, power will continue to be supplied to the volatile memory array 16 and the entire control subsystem 14, so that the data stored in the volatile memory remain in an "on-line" state. Thus, if power is restored while the data protection system is in this power load sequence 74, the main computer 20 can immediately begin accessing the data once the main computer system 20 has been re-booted.

If power is not restored before the expiration of the power load sequence 74, the timers 52 in control subsystem 14 (FIG. 1) will direct the supervisor circuit 38 to begin reduced power load sequence 76 by removing power from the secondary power line 24. When power is removed from the secondary power line 24, those circuits not required to preserve the data in the memory array 16 are de-energized to minimize the power drain on the reserve power supply 34. See FIG. 2. During this reduced power load sequence 76, the data in memory 16 are kept in a "near" on-line status. That is, while data access operations cannot be immediately resumed as soon as power is restored, such data access operations can begin as soon as power is restored to both the main computer system 20 and to the non-essential circuits of control subsystem 14 that are energized by the secondary power line 24.

If power is not restored during this reduced power load sequence 76, the timers 52 in control subsystem 14 will direct the supervisor circuit 38 to reconnect the reserve power supply 34 to the secondary power conductor 24. At this time, the timers 52 will also direct the supervisor circuit 38 to connect the reserve power supply 34 to the tertiary power conductor 26 to energize the non-volatile memory 18, such as a magnetic disk drive or tape unit. Then, after these components have been energized, the data protection system 10 will begin transferring data from the volatile memory 16 to the non-volatile memory array 18 while there is still enough power in the reserve power supply 34 to accomplish this data transfer. After all the data have been transferred, the reserve power supply 34 is disconnected from all the power conductors and the system 10 will remain in this power off state until power is restored to the system. Advantageously, a user selectable recovery option allows the user to select one of two "recovery modes" if power is restored during the data transfer process executed during power sequence 78. If the first recovery mode is selected, the system 10 will continue the data transfer process until all the data have been transferred into the non-volatile memory 18. Only after all the data have been transferred can data access operations resume. If the second recovery mode is selected, the system 10 will immediately abort the data transfer process to allow data access operations to be resumed immediately.

The intelligent data protection system 10 according to this invention, therefore, represents an improvement over the existing volatile memory data protection systems, because data are kept in an on-line state or a "near" on-line state in the volatile memory array 16 for a maximum period of time commensurate with the energy capacity of the reserve power supply 34. Thus, the computer system 20 can be quickly restored to functional status if power is restored anytime during power load sequence 74 or 76 without having to wait for a time consuming data transfer process to be completed. Only if the power remains off for a period longer than the time required to complete power load sequences 74 and 76, i.e., when the reserve power supply 34 is almost exhausted, will data be saved to the non-volatile memory array 18. Consequently, the intelligent data protection system 10 maximizes the utilization of the batteries in the reserve power supply 34, maintaining data for a much longer time than was possible with the prior art data protection systems having equivalently sized back-up batteries.

Another important advantage associated with the data protection system 10 is that the power control sequence 72 is user programmable. That is, the user can determine the length of time that the power sequence 72 dwells in power load sequences 74 and 76, thus allowing the user to tailor the operation of the data protection system to accommodate a wide variety of capacities of reserve power supplies. For example, if a user provides a relatively low capacity reserve power supply (helping to reduce the overall cost of the data protection system), the power sequence 72 can be programmed to keep the data in the on-line and near on-line states (sequences 74 and 76) for a shorter time than would a user with a computer having a higher capacity reserve power supply. Therefore, the user can always obtain optimum utilization of the reserve power supply regardless of the capacity of the reserve power supply.

Still another advantage associated with the data protection system 10 is that it continuously monitors the status of the reserve power supply 34 during power load sequences 74 and 76. If, at any time during these power load sequences 74 and 76, the reserve power supply 34 is discharged to the point where there is only enough energy to accomplish the data transfer task, the data protection system 10 will automatically initiate the data transfer process to ensure complete data integrity even if the user mistakenly programmed too long a time period for power load sequences 74 and 76. This reserve power supply monitoring feature also compensates for less than optimum performance of the reserve power supply batteries that might result from aging or if the batteries were not completely recharged from a previous back-up operation.

Figure 2:
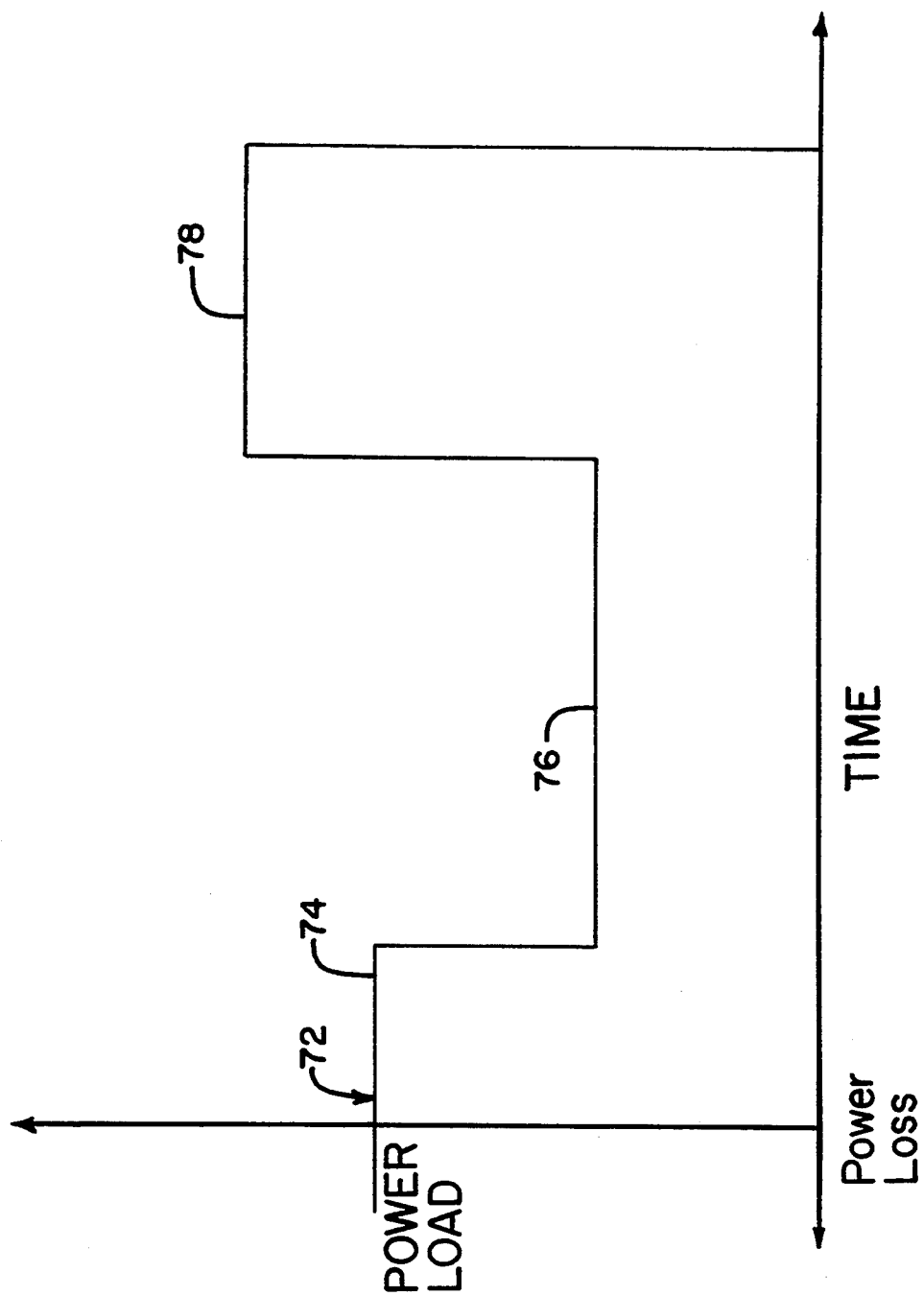
FIG. 2 is a graph of the power control sequence utilized by the intelligent data protection system to minimize the load on the reserve power supply while keeping the data in an on-line or "near" on-line state.

The method of the present invention is best understood by referring to the power control sequence 72 shown in FIG. 2 and the flow charts shown in FIGS. 3–6. As was briefly described above, when an interruption of the main power supply 32 is detected by the data protection system 10, the switch circuit 36 automatically connects reserve power supply 34 to the volatile memory army 16 and control subsystem 14 via primary power line 22 and secondary power line 24. At this time, the power control sequence 72 is in the power load sequence 74 and the power load on the reserve power supply 34 is identical to the power load that was on the main power supply 32 just before the power loss. See FIG. 2. Since the volatile memory 16 and the control subsystem 14 are in the same state that they were before the power loss, the data stored in volatile memory array 16 remain in an on-line state, thereby allowing the computer system 20 to quickly resume data access operations if power is restored while the power sequence 72 is still in power load sequence 74. Note that during execution of the power load sequence 74 the non-volatile memory array 18 is not yet activated, thereby reducing the electrical load on the reserve power supply 34.

If the power to the volatile memory array remains off for a time period longer than the time the power control sequence 72 dwells in power load sequence 74, the data protection system enters reduced power load sequence 76 to further reduce the power load placed on reserve power supply 34. The power load is reduced in power load sequence 76 by removing power from all but the essential elements in the control subsystem 14 that are needed to preserve the data in volatile memory 16, i.e., the volatile memory array 16 itself, timers 52, clock 50, memory control logic 46, and supervisor circuit 38, as will be described below. Therefore, during power load sequence 76, the power load on reserve power supply 34 is the minimum that will still allow the data to be preserved in volatile memory array 16. This power load sequence 76 maintains the data in a "near" on-line state. If power is restored while the intelligent data protection system 10 remains in this reduced power sequence 76, the main computer system 20 can quickly return to a functional state as soon as power is restored to the other, non-essential components of the control subsystem 14, without having to wait for data to be transferred back into the volatile memory array 16 from the non-volatile memory array 18.

If the power remains off for a period longer than that represented by power load sequence 76, the chances are good that the power will not be restored anytime soon, and the data from volatile memory array 16 will be transferred into the non-volatile memory array 18 while there is still enough power remaining in the reserve power supply 34 to accomplish the data transfer process. If this is the case, the switch circuit 36 is directed by the supervisor circuit 38 to supply power to the primary power conductor 22, the secondary power conductor 24, and the tertiary power conductor 26, therefore energizing the entire control subsystem 14, the volatile memory array 16, and the non-volatile memory array 18. The power consumed by these devices is represented by power load sequence 78 of FIG. 2. As will be described in more detail below, the control subsystem 14 will now immediately begin transferring data from the volatile memory array 16 to the non-volatile memory array 18. Then, after all the data have been transferred, the supervisor circuit 38 removes power from the primary, secondary, and tertiary power conductors 22, 24, and 26, respectively, thereby deactivating the entire data protection system 10.

Figure 3:
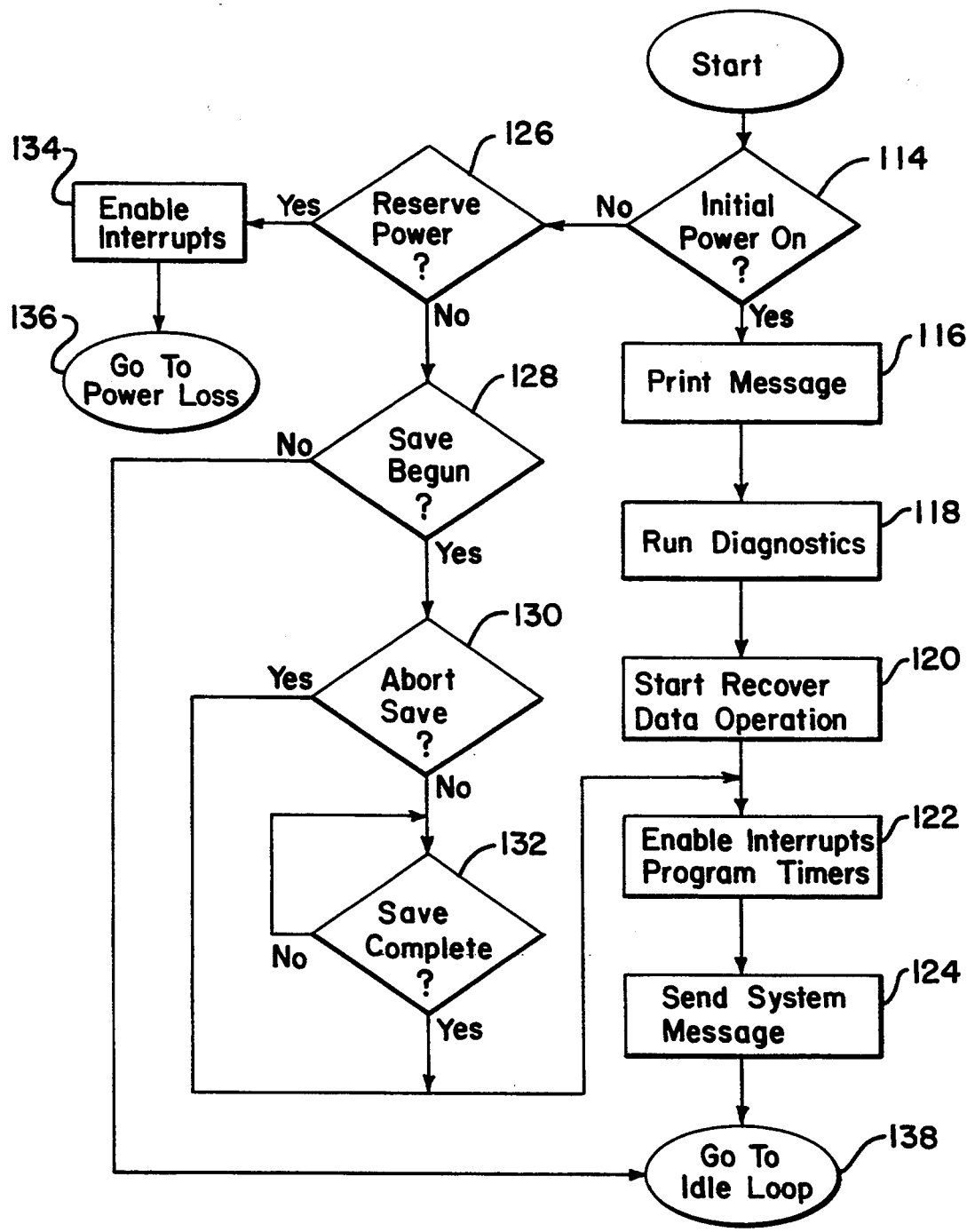
FIG. 3 is a flow chart of the initial power on sequence executed by the intelligent data protection system according to the present invention.
Figure 4:
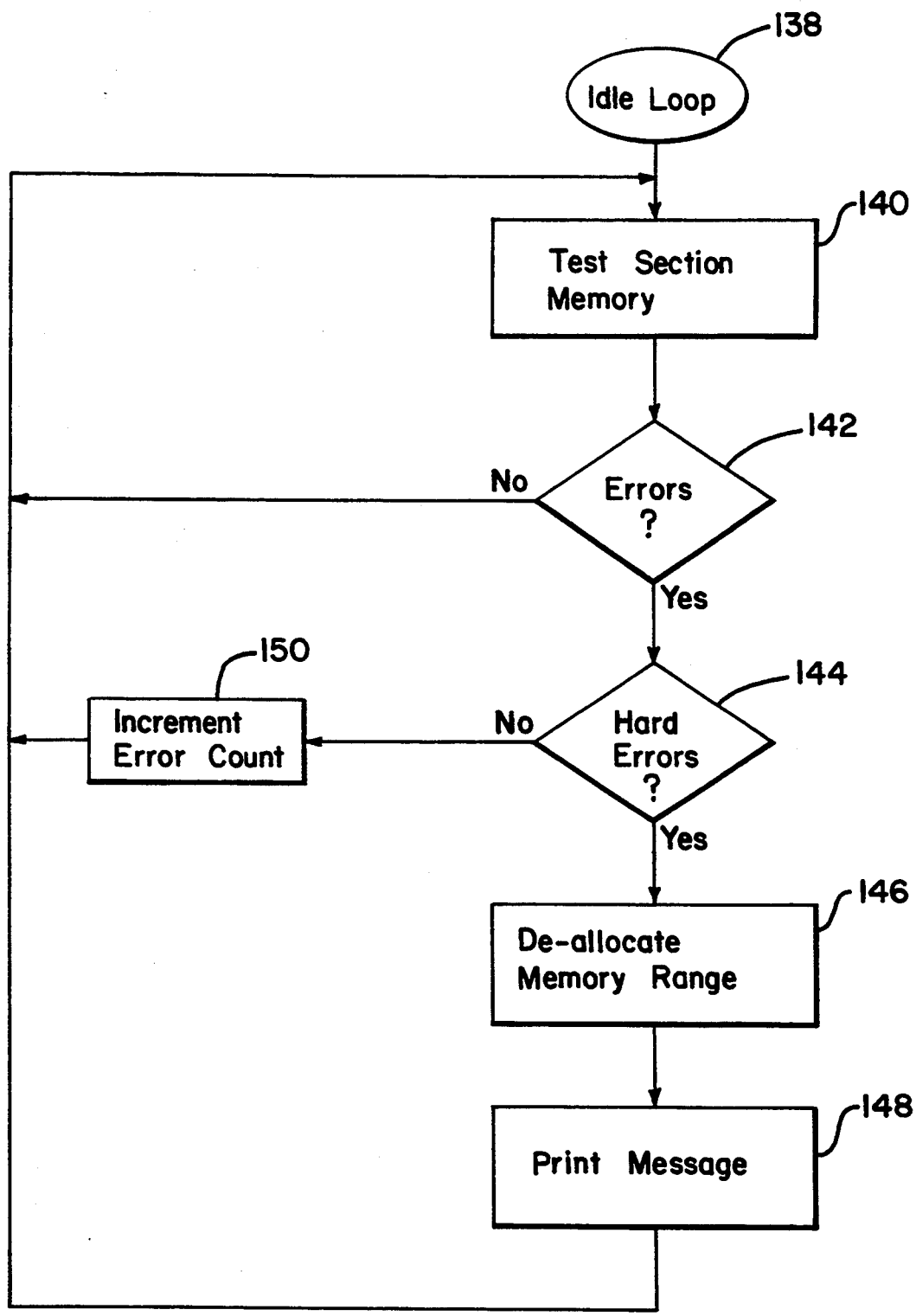
FIG. 4 is a flow diagram of the idle loop process executed by the intelligent data protection system.

The details of the processes executed by the microprocessor 60 to perform the above-described power control sequence 72 are best seen in FIGS. 3, 4, 5, and 6. Referring now to FIG. 3, the first process executed by the microprocessor 60 checks for an initial power on status at decision block 114. If the system 10 has just been powered on, such as, for example, after a power failure and subsequent data transfer operation, the microprocessor executes the print message process 116 which prints a message for the user identifying the intelligent data protection system and indicating that the start up diagnostics 118 will be executed. The run start up diagnostics process 118 is executed to ensure that all components of the system 10 are operating properly. Next, the microprocessor 60 executes step 120 which starts the data recover operation. The data recover operation 120 reloads data from the non-volatile back up memory array 18 into the volatile memory array 16. Once this recover operation 120 is complete, the interrupts generated on the detection of any one of the error or attention conditions, as will be described below, are enabled at step 122 and the power sequence timers 52 (FIG. 1) are programmed according to the predetermined time lengths for each of the individual sequences 74 and 76. A message is printed at step 124 indicating that the overall computing system is powered up and ready to resume operation. The program then proceeds to the idle loop process 138, as shown in FIG. 4.

Referring back to step 114, if this is not an initial power on process, the program proceeds to step 126 and checks to see if the intelligent data protection system 10 is being powered by the reserve power supply 34 (FIG. 1). If the system is being powered by the reserve power supply 34, the process executes step 134 to enable the interrupts before proceeding to the power loss process 136 (FIG. 5), and as will be described below.

If the intelligent data protection system 10 is not operating from the reserve power supply 34, the process proceeds to step 128 to determine if a save operation has begun. This procedure would be executed if power has been restored while data were being saved to the non-volatile memory array 18. If a save operation has not begun, the process proceeds to the idle loop step 138. If the save process has been initiated, the program proceeds to step 130 to determine whether the save process should be aborted, in accordance with pre-programmed instructions by the user. If the abort option had been previously enabled by the user, indicating that the user wants to return to an operating state in the shortest possible time, the program loops back to the enable interrupt step 122, send message step 124, and proceeds to idle loop step 138. If the abort option is not enabled, the program cheeks to see if the save process has been completed at step 132. If not, the save is continued from the last location and again checked until it is completed. When the save process has been completed, the program loops back to the enable interrupts step 122, message step 124, and idle loop step 138.

The details of the idle loop process 138 are best seen in FIG. 4. This idle loop process 138 is optional and is executed in the preferred embodiment because the preferred embodiment contains memory sparing circuitry 108 (FIG. 9), as will be discussed below, to spare out defective memory cells in the volatile memory cell array. Obviously, if such sparing circuitry is not included in the memory control logic 146, the idle loop process 138 would be a simplified process with either no or a minimal memory testing procedure performed.

In the preferred embodiment with memory sparing capability, the idle loop process 138 begins at process 140 which tests a section of the volatile memory array 16 and cheeks for either hard or soft errors in the individual memory cells at step 142. If no errors are found, the program loops back and tests the next section of memory at step 140. If an error is found at step 142, the program proceeds to execute process 144 to determine whether the error is a hard error or a soft error. If the error is a soft error, the error counter is incremented at step 150 and the program loops back to test the next section of volatile memory at step 140. If the error is a hard error, the memory section that contains the hard error will be de-allocated from use and by step 146 and a message will be printed at step 148 to indicate that memory cells have been replaced.

Figure 5:
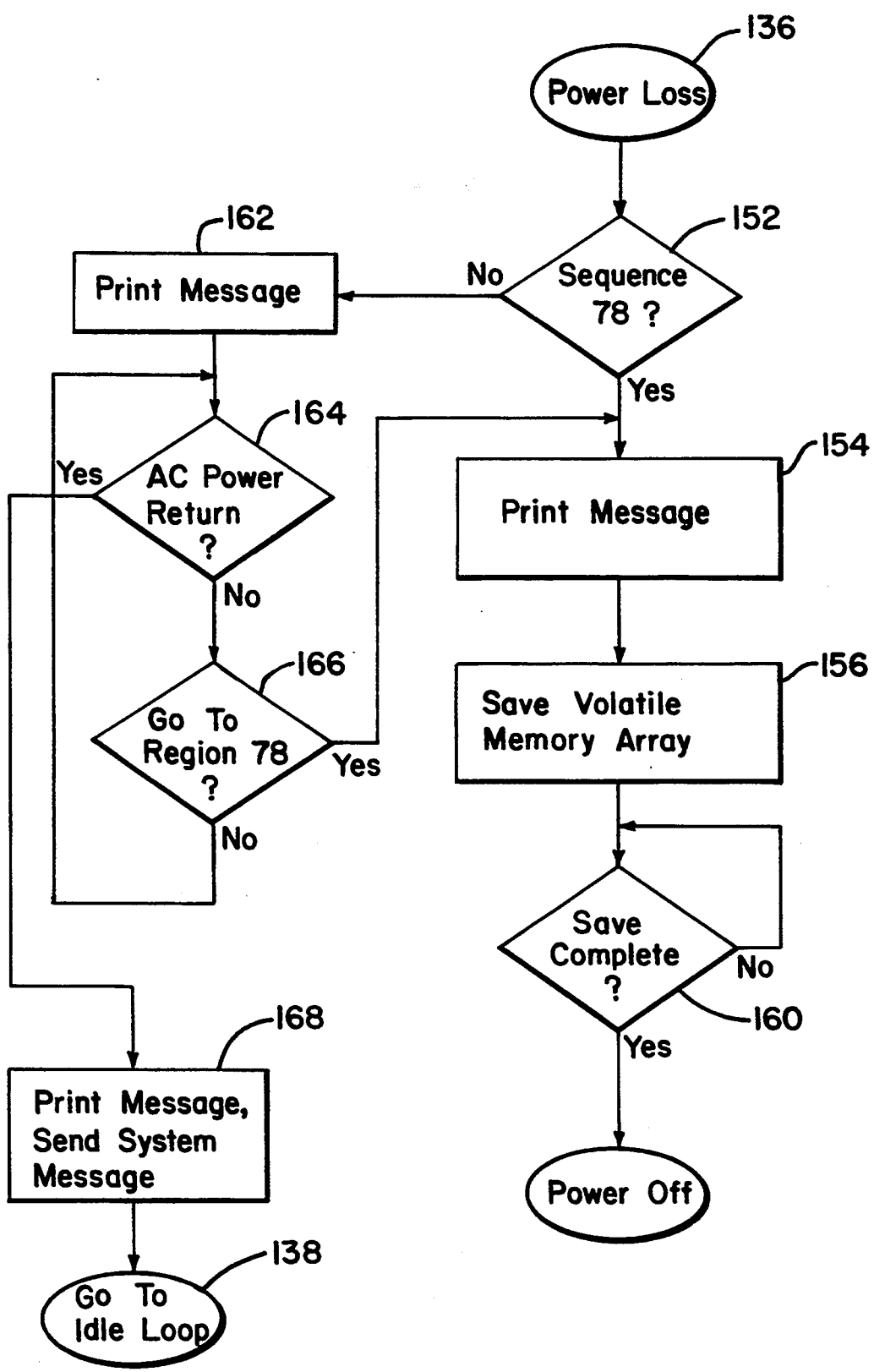
FIG. 5 is a detailed flow diagram of the power loss process executed by the intelligent data protection system according to the present invention.

The power loss process 136 is shown in FIG. 5. When this process 136 is first entered, it checks to see whether the power control sequence 72 (FIG. 2) is currently in power load sequence 78 (FIG. 2) in which data is being transferred into nonvolatile memory 18 (FIG. 1). If the power control sequence 72 (FIG. 2) is not in power sequence 78, the program proceeds to step 162 (FIG. 5) and the microprocessor 60 (FIG. 1) will then print a message to the user indicating that the power control sequence 72 (FIG. 2) is in power load sequence 74 in which both the primary and secondary conductors 22, 24, respectively, (FIG. 1) are powered by reserve power source 34 (FIG. 1), and the system waits for AC power to return. Note that if the process is not in power load sequence 78 (FIG. 2) as detected by step 152 (FIG. 5), then it is in power load sequence 74 (FIG. 2), since the microprocessor 60 (FIG. 1) is powered down during power load sequence 76 (FIG. 2) and none of the processes illustrated in FIGS. 3, 4, 5, or 6 will be executed. The microprocessor next executes step 164 (FIG. 5) and waits for the AC power to return. If power has not been returned, the microprocessor 60 (FIG. 1) executes step 166 (FIG. 5) to determine whether the user wants to override the automatic control of the data protection system 10 (FIG. 1) and instruct it to immediately save data from the volatile memory array 16 into the non-volatile memory array 18. If the user has selected such an option, the program will jump to step 154 (FIG. 5), as will be described below. If the AC power does return, as detected by step 164, the process will proceed to step 168 and send a message to the main computer system 20 (FIG. 1) indicating an on line state and the process will go to the idle loop process 138 (FIG. 5), as described above. If the power control sequence is in power sequence 78 (FIG. 2), the microprocessor 60 (FIG. 1) will print a message indicating that the save operation is beginning and will proceed to step 156 (FIG. 5) to begin saving the data from the volatile memory into the non-volatile memory. The program will execute this process until the save is complete and then shut off power to the entire data protection system 10 (FIG. 1).

Figure 6:
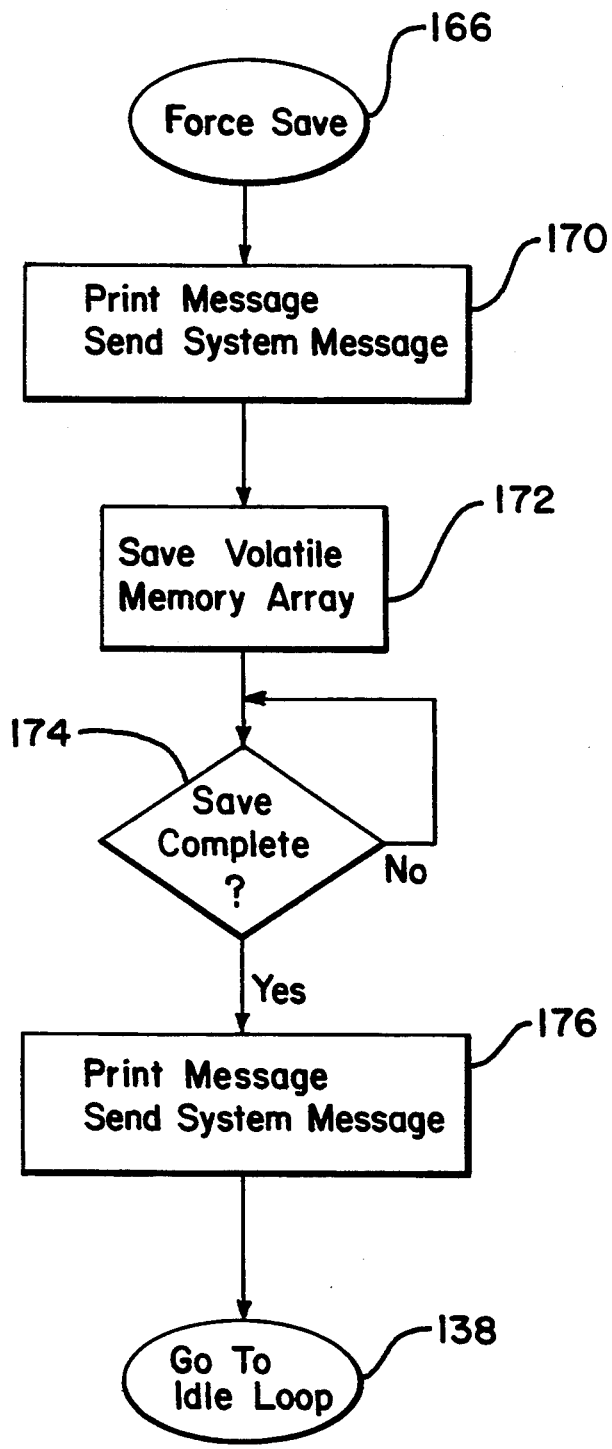
FIG. 6 is flow diagram of the force save process executed by the intelligent data protection system.

The forced save process 166 is shown in detail in FIG. 6. Essentially, this process begins by printing a message at step 170 indicating that the user has initiated a forced save operation at step 166. The data from the volatile memory array 16 are saved in the non-volatile memory array 18 by step 172 until the process is complete as detected by step 174. When all the data from the volatile memory array 16 have been saved into the non-volatile memory array 18, the program will print a message at step 176 indicating that the save operation has been completed and that the computing system is on line. The process will then proceed to the idle loop step 138, as described above. The main difference between the forced save process 166 and the power out save process 156 is that process 156 is executed during a power failure, while the forced save process 166 occurs while the system remains in a powered up or on line state. Thus, when the force save process 166 is complete, the program returns to the idle loop process 138.

The structural details of the intelligent data protection system 10 are best seen by referring to FIGS. 1, 7, 8, and 9 simultaneously. However, before proceeding with a detailed explanation, it should be noted that many of the components in the power subsystem 12 and the control subsystem 14 are well-known in the art and are required in nearly every type of computer system to allow various functions to be performed, such as, for example, data access and refreshing functions as well as data error detection and correction functions. Since such components to accomplish desired functions are well-known and since the specific details of such components would vary depending on the scope of the functions to be performed as well as the particular configuration of the computer system, such components will only be generally described herein.

Referring now to FIG. 1, the main power supply circuit 32 of the power subsystem 12 receives AC power from a main AC power supply, such as a wall plug (not shown), and supplies power at the proper voltage and current to the volatile memory array 16 and to the control subsystem 14 via switch circuit 36 and primary and secondary power conductors 22 and 24. Power from the main power supply 32 is also used to recharge the batteries or other energy storage devices (not shown) in reserve power supply 34 and to power the supervisor circuit 38. As will be described in more detail below, the supervisor circuit 38 controls the operation of switch circuit 36 which selectively connects main or reserve power supplies to the primary power line 22, the secondary power line 24, and the tertiary power line 26.

The details of the main power supply 32 and the reserve power supply 34 will not be described in further detail, because such circuits are well known in the art and persons having ordinary skill in the art could easily provide a suitable main power supply 32 and reserve power supply 34 with sufficient capacity to power the control subsystem 14, volatile memory array 16, and non-volatile memory array 18, depending on the particular configuration of the computer system and after having become familiar with the details of this invention.

Figure 7:
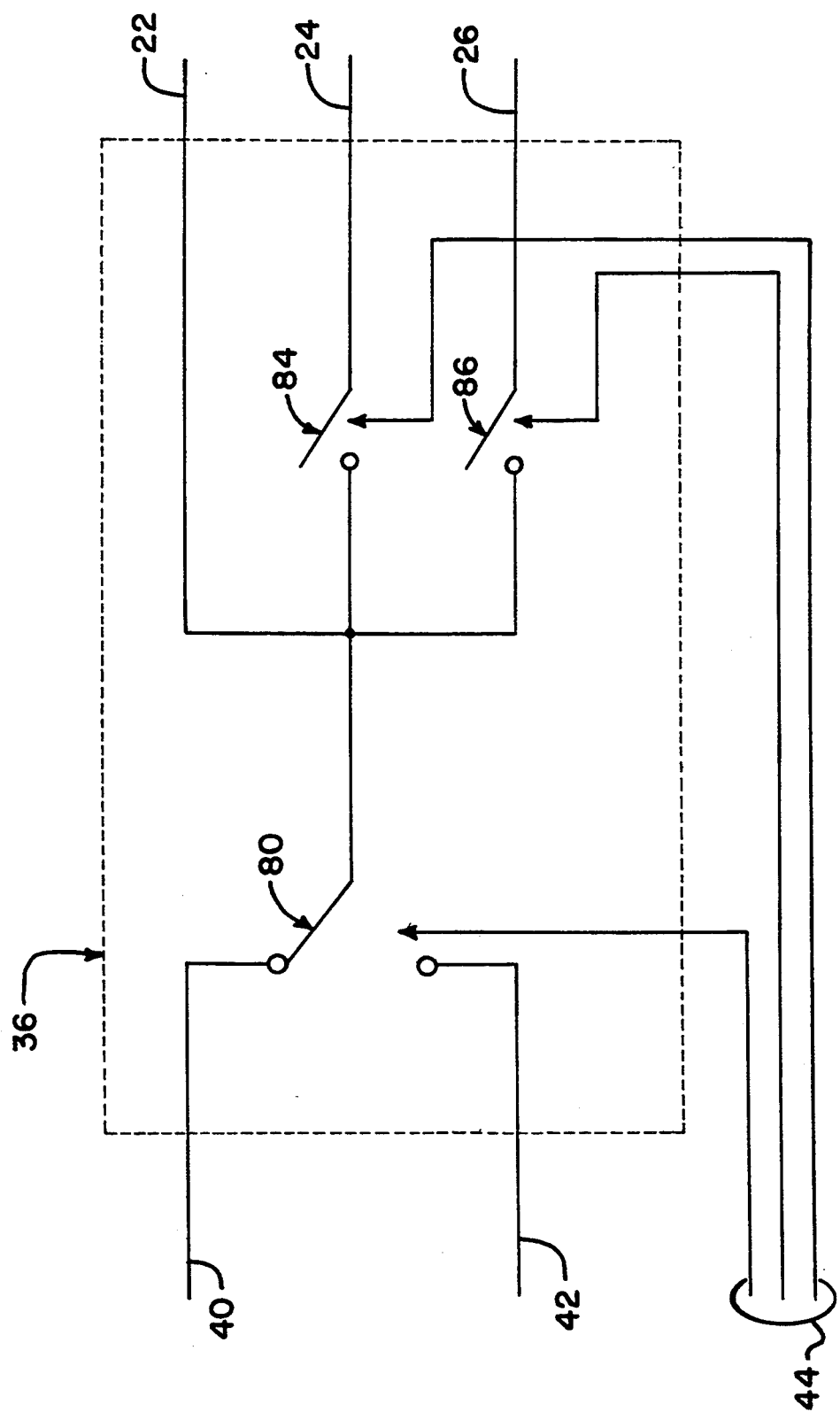
FIG. 7 is a schematic diagram of the switch circuit shown in FIG. 1 showing how power from either the main power supply or reserve power supply can be selectively routed to three individual power conductors.

The details of the switch circuit 36 are best seen in FIG. 7. Essentially, the switch circuit 36 comprises three switches 80, 84, and 86 that selectively connect either the main power supply 32 or the reserve power supply 34 to various combinations of the primary, secondary, and tertiary power conductors 22, 24, and 26, respectively. Note that these three switches 80, 84, and 86 are shown in schematic form in FIG. 7 for simplicity. In reality, such switches 80, 84, and 86 could be anything ranging from simple mechanical relays to solid state components, such as transistors or other equivalent devices, and the selection of the appropriate devices to perform the switching function as described herein would be obvious to persons having ordinary skill in this art depending on the particular power requirements of the computer system and after having become familiar with the details of this invention. Therefore, this invention should not be regarded as being limited to either mechanical relays or solid state components to perform the switching function of switches 80, 84, and 86.

The positions of the main/reserve select switch 80, secondary switch 84, and tertiary switch 86 are controlled by the supervisor circuit 38 via a plurality of lines on control bus 44. Main/reserve switch 80 selects whether the main power supply 32 or the reserve power supply 34 is the source of power for the system by selecting either main power line 40 or reserve power line 42. The selection of the output power lines for the system is done with secondary switch 84, and tertiary switch 86. These switches 84 and 86 are independently controlled by separate lines on control bus 44 and determine whether secondary power line 24 or tertiary power line 26, respectively, are connected to either the main power line 40 or reserve power line 42 (depending on the position of switch 80), along with the primary line 22, which is always connected. Accordingly, when the power from the main power supply 32 is interrupted and the reserve power supply 34 is selected to power the system, one, two, or all three of the power lines 22, 24, or 26 may be energized depending on whether the system 10 is in power load sequence 74, 76, or 78.

Figure 8:
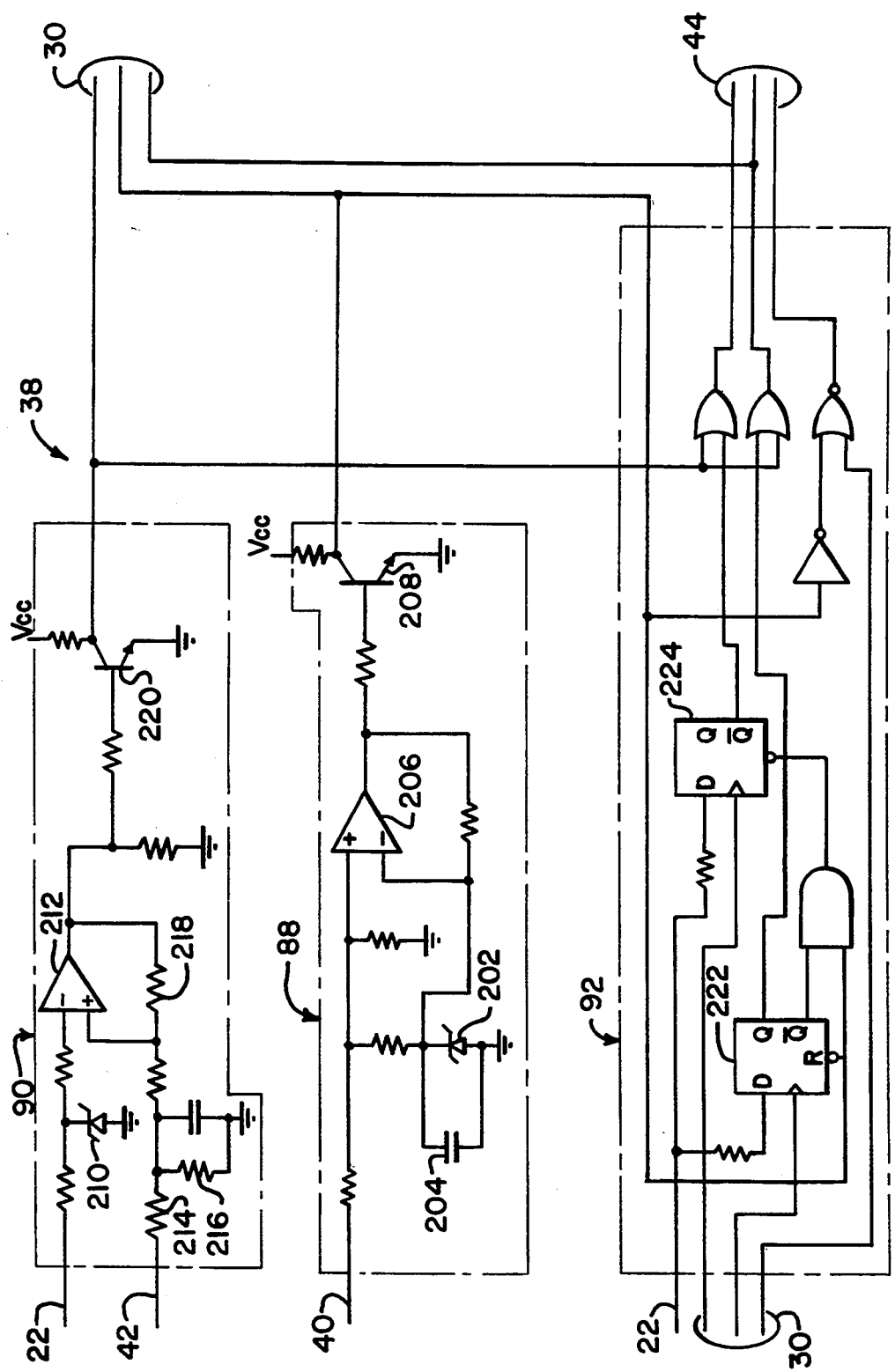
FIG. 8 is a detailed block diagram of the supervisor circuit shown in FIG. 1 showing the power loss detection circuit, the reserve power sensing circuit, and the time out detection circuit.

The supervisor circuit 38 is best seen in FIG. 8 and includes a power loss detection circuit 88, a reserve power sense circuit 90, and a time out detection circuit 92, each of which will be described below. Essentially, the supervisor circuit 38 monitors the system power supplies (i.e., main power supply 32 and reserve power supply 34), and generates the switch control signals which control the positions of the switches 80, 84, and 86 in switch circuit 36 via control bus 44.

The power loss detection circuit 88 monitors the main power supply 32 via main power line 40. If a power interruption is detected, the power loss detection circuit 88 sends switch control signals to the switch circuit 36 via control bus 44 and sends status information to the control subsystem 14 via power supply status line 30. A zener diode 202 provides a reference voltage for comparison with the voltage on the main power line 40 and a capacitor 204 helps to hold the reference voltage at the set level immediately following a power loss. During normal operation from the main power supply 32, the output voltage of comparator 206 is positive, which keeps transistor 208 turned on and the voltage on the power supply status line 30 "low" (logic level 0). When the voltage on the main power line 40 drops to a level below the reference voltage, indicating a power failure, the output voltage of comparator 206 swings from positive to negative, turning off transistor 208, which causes the power supply status line 30 to go "hi" (logic level 1), indicating a loss of the main power supply 32.

The reserve power sense circuit 90 monitors the voltage of the reserve power supply 34 via reserve power line 42. If a low voltage condition is detected, indicating that the storage batteries in the reserve power supply 34 are almost exhausted, control signals are sent to the switch circuit 36 via control bus 44 and a status signal is sent to the control subsystem 14 via power supply status line 30, so that the system 10 can immediately initiate the data transfer process before the reserve battery is exhausted. More specifically, the primary power line 22, secondary power line 24, and tertiary power line 26 will all be connected to the reserve power line 42 via switches 82, 84, 86, respectively, and the control subsystem 14 will begin transferring data from the volatile memory array 16 to the non-volatile memory array 18, thereby preventing data loss.

In the reserve power sensing circuit 90, a zener diode 210 is used to create a reference voltage for comparator 212 which monitors the voltage on primary power line 22. Since primary power line 22 is supplied by either the main power supply 32 during normal operation or by the reserve power supply 34 during a power failure, comparator 212 monitors the status of the reserve power supply 34 even during normal operation. Suitable resistors, such as resistors 214, 216 may be required to reduce the voltage on reserve power line 42 to create a "safe minimum voltage level" for comparison by comparator 212. That is, a given battery in the reserve power supply 34 will safely power the system 10 in either power sequence 74 or reduced power sequence 76 until it reaches some safe minimum voltage level, at which point there will only be enough energy left in the battery to just safely complete the data transfer process. The specific safe minimum voltage level will, of course, depend on the particular discharge curve of the battery in the reserve power supply and on the energy required by the various components of the system 10 to complete the data transfer process during power load sequence 78. However, the determination of such a safe minimum voltage would be obvious to persons having ordinary skill in this art based on these factors and such a person could then select the proper values for resistors 214 and 216 to provide the comparator 212 with the safe minimum voltage as a reference voltage. Finally, a feedback resistor 218 provides hysteresis on the switching of comparator 212.

When the voltage of the reserve power supply 34 (sensed on line 42) is above the safe minimum voltage level, the output of comparator 212 will be positive, thus turning on transistor 220 and driving the power supply status line 30 "low" (logic level 0). If the voltage of the reserve power supply falls below the predetermined safe minimum voltage, the output of comparator 212 will be negative, thus turning off transistor 220 and driving the power supply status line 30 "high" (logic level 1).

The time out detection circuit 92 is enabled by power supply status line 30 when a power loss is detected by the power loss detection circuit 88. So long as the voltage on the main power line 40 is at an acceptable level, the voltage level of sense line 30 will be "low" (logic level 0), which holds flip-flops 222 and 224 in a reset state. This sets the control signals on the two lines on control bus 44 that control the main/reserve select switch 80 and the secondary switch 84. During normal operation, the main power switch 80 selects the main power supply, the secondary power switch 84 will be activated, and the tertiary power switch 86 will be inactivated.

If the voltage of the main power supply 32 drops below the reference level set by zener diode 202, indicating a power failure, the power supply status line 30 goes "high" (logic level 1) and the switch 80 in switch circuit 36 connects the reserve power supply 34 to the primary power line 22 and the secondary power line 24. The rest of the control lines 44 remain in the same state until flip-flop 224 is clocked by a control line from the timers 52 via status bus 30, indicating that the time period 74 has timed out. At this time, the select line 44 for the secondary power switch 84 goes low, which deactivates the switch 84 and removes power from the secondary power bus 24. The system remains in this state until flip-flop 222 is clocked by a control line from the timers 52 via status line 30, indicating that the time period 76 has expired. When sequence 76 has expired, the control lines 44 for secondary switch 84 and tertiary switch 86 go high, thus activating these switches and connecting the reserve power to both the secondary and tertiary power lines 24 and 26, respectively. The switch control lines 44 stay in this state until a control line from the timer circuit 52 goes active and forces the control line for the power switch 80 to a low state which selects the main power supply and powers the system off, since the main power supply is dead. The system has now completed time period 78 and is through the entire power sequence.

Note that if the reserve power sense output line goes active at any time, indicating that the voltage of the reserve power supply 34 has fallen below the safe minimum voltage, the time out detection circuit 92 forces the secondary and tertiary power switches 84 and 86 to close, thus supplying power to secondary and tertiary lines 24, 26, respectively. This sequence allows the system 10 to immediately enter the full power sequence 78 and begin the data save sequence anytime the voltage of the reserve power supply 34 falls below the safe minimum voltage. Note also that the entire supervisor circuit 38 is powered by the primary power line 22, thereby ensuring that this circuit 38 always receives power.

The details of the control subsystem 14 are best seen by referring to FIG. 1. Most of the components in control subsystem 14 are conventional and well-known components that are required to control data flow into and out of the volatile memory 16 and to refresh and maintain the data via memory address bus 64 and data bus 62. However, as will be described in detail below, control subsystem 14 also includes special circuitry and logic to monitor the status of the power subsystem 12 via power supply status line 30 to determine when there has been an interruption of the main power supply 32, and such special components will be described in detail.

Essentially, the operation of the control subsystem 14 is controlled by the microprocessor 60 which determines the status of the data protection system 10 (i.e., whether the system is in power loss sequence 74, 76, or 78) and directs responses based on the results of the status. The microprocessor 60 receives status information and gives commands via buses 30 and 68. The program that controls the microprocessor 60 is stored in the ROM (read only memory) 54 which communicates with the microprocessor 60 via data bus 68, as is well-known.

The clock 50 synchronizes the microprocessor 60, the timers 52, and the memory control logic circuit 46 via clock signal control line 66. The timers 52 may include a plurality of conventional well-known timers to time the individual events in the intelligent data protection system 10 and to keep the power back-up sequence running even though the microprocessor 60 is powered down during power load sequence 76. The interrupt logic circuit 58 interrupts the microprocessor 60 when an error or attention condition occurs, such as, for example, an AC power loss, low reserve power, ECC errors, host transfer parity errors, configuration initialization problems, and the like. Such processor interrupt status information is transferred over control bus 68. The interrupt event notification is made to the interrupt logic circuit 58 over power supply status line 30. The configuration logic circuit 56 is programmable by the user and allows the user to configure the intelligent data protection system 10 according to his requirements, as described above. This configuration logic 56 interrupts the microprocessor 60 via the interrupt logic circuit 58 and communicates over control bus 68.

The host interface logic circuit 48 communicates with the main or host computer system 20 via data bus 28. Essentially, this host interface logic circuit 48 controls the transfer of data to and from the main computer system 20 and to and from the memory control logic circuit 46 via data bus 28 and data bus 70, respectively. The details of such host interface logic 48 are dependent on the particular requirements of the main processor 20 as well as the volatile memory array 16, and would be obvious to persons having ordinary skill in the art after becoming familiar with the details of this invention. Therefore, the details of the host interface logic circuit 48 will not be described in further detail.

Figure 9:
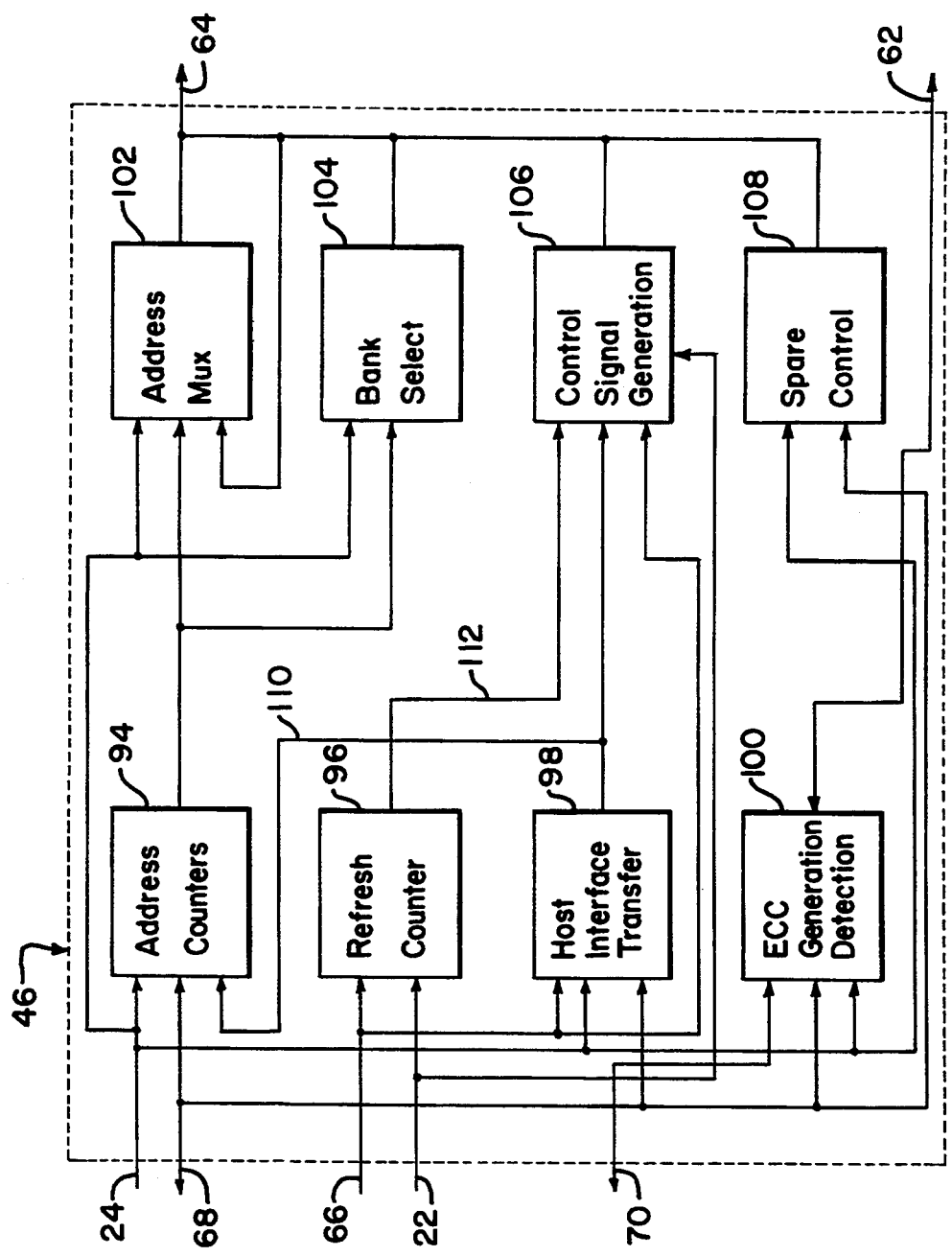
FIG. 9 is a block diagram of the memory control logic circuit shown in FIG. 1.

The details of the memory control logic circuit 46 are best seen in FIG. 9. The particular memory control logic circuit 46 shown in block form in FIG. 9 is specifically designed for use with a volatile memory array 16 comprising dynamic random access memory (DRAM), such as would be used in a solid state disk drive system. Of course, different types or configurations of the volatile memory array 16 would require corresponding changes in the design of the memory control logic circuit 46, as would be obvious to persons having ordinary skill in the art.

The host interface transfer circuit 98 controls the transfer of data to and from the host interface logic circuit 48 (FIG. 1), as is well-known. The control of the transfer is handled on bus 68. During a data transfer process, the address counters 94 are loaded with their initial values via control bus 68. The memory addresses are then incremented as data are transferred by the memory control logic circuit 46. The incrementing of the address counters 94 is controlled by the host interface transfer circuit 98 via control bus 110. The particular address to be accessed in the memory is then supplied to the address multiplexer, or address mux 102 and bank select circuit 104. These circuits 102, 104 provide the access to the volatile memory array 16 in the required format and select which bank of the memory array 16 is being accessed. The memory address and bank selection signals are supplied on bus 64.

The refresh counter circuit 96 counts the required time period between the refresh cycles required by the dynamic random access volatile memory array 16. The clock signal for the refresh counter 96 is provided by clock signal bus 66 and the refresh request signal is sent to the control signal generation circuit 106 via bus 112. The control signal generation circuit 106 takes input from the refresh counter circuit 96 and the host interface transfer circuit 98, and determines when to generate the appropriate control signals to the volatile memory array 16 via control bus 64. The timing of the control signals is input via bus 66.

In the preferred embodiment, the data in the volatile memory array 16 are corrected by an ECC generation and detection circuit 100 in accordance with well-known principles. Briefly, this ECC generation and detection circuit 100 generates an error correcting (ECC) code and stores it with the data when data are written into the volatile memory array 16. When the data are read from the volatile memory array 16, the ECC code is checked against the stored ECC codes for errors, and corrections to the data are made if required. The data path to and from the volatile memory array 16 for these ECC signals and the actual data is on the data bus 62 and from or to the host interface logic circuit 48 on data bus 70. The status of the ECC detection and the control of the ECC generation is handled by control bus 68. The data are transferred from the volatile memory array 16 to the main computer system 20 via data bus 62, ECC generation detection circuit 100, data bus 70, host interface logic 48, and data bus 28.

Finally, the memory control logic circuit 46, according to this invention, may also include a spare control circuit 108 for mapping bad memory cells in the volatile memory array to a spare memory location.

Most of these logic circuits in the memory control logic 46 are powered by the secondary power line 24, since such "non-essential" circuits are not required to maintain the integrity of the data in the volatile memory array 16. More specifically, address counter circuit 94, address multiplexer 102, the host interface transfer circuit 98, the ECC generation and detection circuit 100, spare control circuit 108, and the bank select circuit 104 are all powered from the secondary power line 24.

The essential elements of the memory control logic circuit 46, i.e., those elements required to continually maintain or refresh the data in the volatile memory, that must be continually supplied with power via primary power line 22 are the refresh counter circuit 96 and the control signal generation circuit 106.

This concludes the detailed description of the intelligent data protection system 10 according to this invention. It should be noted that the details of the system 10 are somewhat tied to the specific configuration of the memory systems and the main computer system. Other system configurations may require certain changes in either the hardware or software portions of the data protection system 10, which changes would be obvious and could be readily provided or substituted by persons having ordinary skill in this art after becoming familiar with the principles of this invention. Therefore, the present invention should not be regarded as limited to the particular system configurations shown and described herein.

The foregoing is considered to be illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to as falling within the scope of the invention as defined by the claims which follow.

The embodiments of the invention in which an exclusive property or privilege is claimed are defined as follows:

1. A data protection system for use with a host computer system, comprising:

volatile memory means for storing data, said volatile memory means requiring electric power to maintain data and for transferring data into and out of said volatile memory means;

nonvolatile memory means for storing data, said nonvolatile memory means requiring electric power for transferring data into and out of said nonvolatile memory means but capable of maintaining data without electric power;

memory access control means connected to said volatile memory means, to said host computer system, and to said nonvolatile memory means for accessing and transferring data into and out of said volatile memory means to and from said host computer system and to and from said nonvolatile memory means, said memory access control means requiring electric power for said accessing and transferring data;

main power supply means for supplying electric power from an external electric power source to said volatile memory means, to said nonvolatile memory means, and to said memory access control means;

reserve power supply means having a limited electric power source that is capable of supplying a limited amount of electric power to said volatile memory means, to said nonvolatile memory means, and to said memory access control means for respective limited times;

switch means connected to said main power supply means, to said reserve power supply means, to said volatile memory means, and to said memory access control means for selectively connecting either said main power supply means or said reserve power supply means to selected ones of said volatile memory means, said nonvolatile memory means, and said memory access control means; and supervisor circuit means connected to said main power supply means, to said reserve power supply means, to said switch means, and to said memory access control means for generating on-line main power mode signals to said switch means and to said memory access control means when said main power supply means is providing adequate electric power to operate both said volatile memory means and said memory access control means, for sensing when said main power supply means is not providing said adequate electric power and in response generating on-line reserve power mode signals to said switch means and to said memory access control means immediately upon sensing that said main power supply means is not providing said adequate electric power, for sensing when a first time period has elapsed after generation of said on-line reserve power mode signals and said main power supply means is still not providing said adequate electric power and in response generating near on-line reserve power mode signals to said switch means and to said memory access control means, and for sensing when a second time period has elapsed after generation of said near on-line reserve power mode signals and said main power supply means is still not providing said adequate electric power and in response generating back-up data transfer mode signals to said switch means and to said memory access control means;

said switch means being responsive to said on-line main power mode signals to connect said main power supply means to said volatile memory means and to said memory access control means, and said memory access control means being responsive to said on-line main power mode signals to facilitate transferring data into and out of said volatile memory means to and from said host computer system;

said switch means being responsive to said on-line reserve power mode signals to connect said reserve power supply means to said volatile memory means and to said memory access control means, and said memory access control means being responsive to said on-line reserve power mode signals to facilitate transferring data into and out of said volatile memory means to and from said host computer system said reserve power supply means supplying a first level of electric power;

said switch means being responsive to said near on-line reserve power mode signals to maintain said connect of said reserve power supply means to said volatile memory means and to disconnect said reserve power supply means from said memory access control means, said reserve power supply means supplying a second level of electric power which is less than said first level; and said switch means being responsive to said back-up data transfer mode signals to maintain said connect of said reserve power supply means to said volatile memory means, to reconnect said reserve power supply means to said memory access control means, and to connect said reserve power supply means to said nonvolatile memory means; said memory access means being responsive to said back-up data transfer mode signals to transfer data out of said volatile memory means to said nonvolatile memory means said reserve power supply means supplying a third level of electric power which is greater than said second level.

2. The data protection system of claim 1, including reserve power monitor means connected to said reserve power supply means and to said supervisor circuit means for comparing voltage provided by said reserve power supply means to a safe minimum level voltage and for generating a low reserve power signal when the voltage provided by the reserve power supply means is below said safe minimum level, said supervisor circuit means being responsive to said low reserve power signal to generate said back-up data transfer mode signals.

3. The data protection system of claim 1, wherein said supervisor circuit means is also for generating power down mode signals to said switch means and to said memory access control means after the transfer of data out of said volatile memory means to said nonvolatile memory means, said switch means being responsive to said power down signals to switch connection of said volatile memory means, said memory access control means, and said nonvolatile memory means from connection with said reserve power supply means to said main power supply means.

4. The data protection system of claim 3, wherein said memory access control means is responsive to on-line main power mode signals from said supervisor circuit means that occur after said power down mode signals to recover data from said nonvolatile memory means back into said volatile memory means and for generating data recovery complete mode signals after the data is recovered back into the volatile memory.

5. The data protection system of claim 4, wherein said supervisor circuit means is responsive to said data recovery complete mode signals to generate nonvolatile memory disconnect mode signals to said switch means, and said switch means being responsive to said nonvolatile memory disconnect mode signals to disconnect said main power supply means from said nonvolatile memory means.

6. The data protection system of claim 5, wherein said first time period is adjustable.

7. The data protection system of claim 5, wherein said second time period is adjustable.

8. The data protection system of claim 5, wherein said supervisor circuit means is also for sensing when a third time period has elapsed after generation of said back-up data transfer mode signals and for generating said power down mode signals after said third time period has elapsed.

9. The data protection system of claim 8, wherein said third time period is adjustable.

10. The data protection system of claim 1, wherein said volatile memory means includes an array of electronic memory cells that require periodic refreshing with new electric charge to maintain storage of data, and refresh circuit means connected to said switch means for providing periodic refresh control signals to said electronic memory cells when said refresh circuit means is connected by said switch means either to said main power supply means or to said reserve power supply means.

11. The data protection system of claim 10, wherein said refresh circuit means includes refresh control signal generation means connected to said switch means and to said array of electronic memory cells for generating the refresh control signals, refresh counter means connected to said switch means and to said refresh control signal generation means for determining time intervals for said refresh control signals, and clock means connected to said switch means, to said refresh control signal generation means and to said refresh counter means for providing clock signals to said refresh control signal generation means and to said refresh counter means.

12. The data protection system of claim 1, wherein said memory access control means includes memory control logic means connected to said volatile memory means, to said nonvolatile memory means, to said host computer system, and to said switch means for formatting and controlling transfer of data into and out of said volatile memory means and to and from either said host computer system or said nonvolatile memory means.

13. The data protection system of claim 12, wherein said memory access control means includes host interface logic means connected between said memory control logic means and said host computer system for formatting data transfer between said memory control logic means and said host computer system, said host interface logic means also being connected to said switch means.

14. The data protection system of claim 13, wherein said memory access control means includes microprocessor means connected to said memory control logic means and to said nonvolatile memory means for generating signals to activate said memory control logic means to transfer data from said volatile memory means to said nonvolatile memory means in response to said back-up data transfer mode signals and to recover data from said nonvolatile memory means to said volatile memory means in response to said on-line main power mode signals that occur after said power down mode signals, said microprocessor means also being connected to said switch means.

15. The data protection system of claim 14, wherein said memory access control means includes interrupt logic means connected to said microprocessor means and to said supervisor circuit means for sensing said on-line main power mode signals, said on-line reserve power mode signals, said near on-line reserve power mode signals, and said back-up data transfer mode signals from said supervisor circuit means and for generating interrupt signals to said microprocessor means in response to said signals from said supervisor circuit means, said interrupt logic means also being connected to said switch means.

16. The data protection system of claim 15, wherein said memory access control means includes adjustable configuration logic means connected to said microprocessor means, to said supervisor circuit means, and to said interrupt logic means for adjustably setting said first time period and said second time period, said adjustable configuration logic means also being connected to said switch means.

17. The data protection system of claim 16, wherein said adjustable configuration logic means is also for selecting whether said microprocessor means is responsive to a main power supply mode signal that occurs during transfer of data from said volatile memory means to said nonvolatile memory means in a manner that aborts said transfer of data to said nonvolatile memory means and to activate immediately the host interface logic means for data transfer between said host computer system and said volatile memory means or instead delay activating said host interface logic means until the transfer of data to said nonvolatile memory means is finished.

18. The data protection system of claim 17, wherein said volatile memory means includes an array of electronic memory cells that require periodic refreshing with new electric charge to maintain storage of data, and refresh circuit means connected to said switch means for providing periodic refresh control signals to said electronic memory cells when said refresh circuit means is connected by said switch means either to said main power supply means or to said reserve power supply means, said refresh circuit means includes refresh control signal generation means connected to said switch means and to said array of electronic memory cells for generating the refresh control signals, refresh counter means connected to said switch means and to said refresh control signal generation means for determining time intervals for said refresh control signals, and clock means connected to said switch means, to said refresh control signal generation means and to said refresh counter means for providing clock signals to said refresh control signal generation means and to said refresh counter means; said data protection system also including primary conductor means connected between said switch means and said volatile memory means, secondary conductor means connected between said switch means and said memory access control means, and tertiary conductor means connected between said switch means and said nonvolatile memory means; wherein said switch means connects said main power supply means to said primary conductor means and to said secondary conductor means in response to either said on-line reserve power mode signals; wherein said switch means disconnects said secondary conductor means from said reserve power supply means in response to said on-line reserve power mode signals while leaving said primary conductor means connected to said reserve power supply means; and wherein said switch means connects said reserve power supply means to said primary conductor means, to said secondary conductor means, and to said tertiary conductor means in response to said back-up data transfer mode signals.

19. The data protection system of claim 18, including reserve power monitor means connected to said reserve power supply means and to said supervisor circuit means for comparing voltage provided by said reserve power supply means to a safe minimum level voltage and for generating a low reserve power signal when the voltage provided by the reserve power supply means is below said safe minimum level, said supervisor circuit means being responsive to said low reserve power signal to generate said back-up data transfer mode signals; said data protection system also including tertiary conductor means connected between said switch means and said nonvolatile memory means for conducting electric power from either said main power supply means or said reserve power supply means, as connected by said switch means, to said nonvolatile memory means.

20. The data protection system of claim 1, including primary conductor means connected between said switch means and said volatile memory means, secondary conductor means connected between said switch means and said memory access control means, and tertiary conductor means connected between said switch means and to said nonvolatile memory means; wherein said switch means connects said main power supply means to said primary conductor means and to said secondary conductor means in response to either said on-line reserve power mode signals; wherein said switch means disconnects said secondary conductor means from said reserve power supply means in response to said on-line reserve power mode signals while leaving said primary conductor means connected to said reserve power supply means; and wherein said switch means connects said reserve power supply means to said primary conductor means, to said secondary conductor means, and to said tertiary conductor means in response to said back-up data transfer mode signals.

21. A data protection system for use with a host computer system, comprising:

volatile memory means for storing data, said volatile memory means requiring electric power to maintain data and for transferring data into and out of said volatile memory means;

nonvolatile memory means for storing data, said nonvolatile memory means requiring electric power for transferring data into and out of said nonvolatile memory means but capable of maintaining data without electric power;

memory access control means connected to said volatile memory means, to said host computer system, and to said nonvolatile memory means for accessing and transferring data into and out of said volatile memory means to and from said host computer system and to and from said nonvolatile memory means, said memory access control means requiring electric power for said accessing and transferring data;

main power supply means for supplying electric power from an external electric power source to said volatile memory means, to said nonvolatile memory means, and to said memory access control means;

reserve power supply means having a limited electric power source that is capable of supplying a limited amount of electric power to said volatile memory means, to said nonvolatile memory means, and to said memory access control means for respective limited times;

switch means connected to said main power supply means, to said reserve power supply means, to said volatile memory means, and to said memory access control means for selectively connecting either said main power supply means or said reserve power supply means to selected ones of said volatile memory means, said nonvolatile memory means, and said memory access control means; and supervisor circuit means connected to said main power supply means, to said reserve power supply means, to said switch means, and to said memory access control means for generating on-line main power mode signals to said switch means and to said memory access control means when said main power supply means is providing adequate electric power to operate both said volatile memory means and said memory access control means, for sensing when said main power supply means is not providing said adequate electric power and in response generating on-line reserve power mode signals to said switch means and to said memory access control means immediately upon sensing that said main power supply means is not providing said adequate electric power, for sensing when a first time period has elapsed after generation of said on-line reserve power mode signals and said main power supply means is still not providing said adequate electric power and in response generating near on-line reserve power mode signals to said switch means and to said memory access control means, and for sensing when reserve power is depleted to an amount that can just safely execute a bulk transfer of data from said volatile memory to said nonvolatile memory after generation of said near on-line reserve power mode signals and said main power supply means is still not providing said adequate electric power and in response generating back-up data transfer mode signals to said switch means and to said memory access control means;

said switch means being responsive to said on-line main power mode signals to connect said main power supply means to said volatile memory means and to said memory access control means, and said memory access control means being responsive to said on-line main power mode signals to facilitate transferring data into and out of said volatile memory means to and from said host computer system;

said switch means being responsive to said on-line reserve power mode signals to connect said reserve power supply means to said volatile memory means and to said memory access control means, and said memory access control means being responsive to said on-line reserve power mode signals to facilitate transferring data into and out of said volatile memory means to and from said host computer system said reserve power supply means supplying a first level of electric power;

said switch means being responsive to said near on-line reserve power mode signals to maintain said connect of said reserve power supply means to said volatile memory means and to disconnect said reserve power supply means from said memory access control means said reserve power supply means supplying a second level of electric power which is less than said first level; and said switch means being responsive to said back-up data transfer mode signals to maintain said connect of said reserve power supply means to said volatile memory means, to reconnect said reserve power supply means to said memory access control means, and to connect said reserve power supply means to said nonvolatile memory means; said memory access means being responsive to said back-up data transfer mode signals to transfer data out of said volatile memory means to said nonvolatile memory means said reserve power supply means supplying a third level of electric power which is greater than said second level.

22. In a data storage system for receiving and storing data from a host computer system for later access of the data by the host computer system, wherein the data storage system has a volatile memory which requires a first level of electric power for maintaining data in the volatile memory, a memory access control system for facilitating transfer of data into and out of the volatile memory that requires a second level of electric power such that transferring data into and out of the volatile memory with the memory access control system requires more electric power than does maintaining data in the volatile memory, a nonvolatile memory that requires a third level of electric power while transferring data into said nonvolatile memory but which requires no electric power to maintain data in said nonvolatile memory, a main power supply connected to said volatile memory for providing electric power from an external source to said volatile memory, and a reserve power supply that has a limited amount of electric power, a process of protecting data stored in the volatile memory, comprising the steps of:

monitoring and comparing voltage of said main power supply to a threshold voltage level that is required to provide both the first and second levels together of electric power;

supplying electric power from said main power supply to said volatile memory and to said memory access control system when said main power supply has at least said threshold voltage level;

disconnecting said volatile memory and said memory access system from said main power supply when said main power supply does not have at least said threshold voltage level and connecting said volatile memory and said memory access system instead to said reserve power supply for providing both said first and second levels together of electric power to said volatile memory and to said memory access system;

continuing said monitoring and comparing voltage of said main power supply to said threshold voltage level for a first time period after connecting said volatile memory and said memory access system to said reserve power supply, and when the voltage of the main power supply does not return to said threshold voltage level within said first time period, then disconnecting said memory access system from said reserve power supply;

continuing said monitoring and comparing voltage of said main power supply to said threshold voltage level for a second time period after disconnecting said memory access system from said reserve power supply, and when the voltage of the main power supply does not return to said threshold voltage level within said second time period, then reconnecting said memory access system to said reserve power supply, connecting said nonvolatile memory to said reserve power supply, and transferring data from said volatile memory to said nonvolatile memory while said reserve power supply still has sufficient power to supply said first, second, and third levels together of electric power; and after completing transfer of data from said volatile memory to said nonvolatile memory, disconnecting said volatile memory, said memory access system, and said nonvolatile memory from said reserve power supply, and reconnecting said volatile memory, said memory access system, and said nonvolatile memory to said main power supply.

23. The process of claim 22, including the steps of continuing said monitoring and comparing voltage of said main power supply to said threshold voltage level after reconnecting said volatile memory, said memory access system, and said nonvolatile memory to said main power supply, and when said main power supply again has said threshold voltage level, then recovering data from said nonvolatile memory back into said volatile memory.

24. The process of claim 23, including the step of disconnecting said nonvolatile memory from main power supply after said step of recovering data from said nonvolatile memory back into said volatile memory.

25. A data protection system for use with a host computer system, comprising:

volatile memory means for storing data, said volatile memory means requiring electric power to maintain data and for transferring data into and out of said volatile memory means;

nonvolatile memory means for storing data, said nonvolatile memory means requiring electric power for transferring data into and out of said nonvolatile memory means but capable of maintaining data without electric power;

memory access control means connected to said volatile memory means, to said host computer system, and to said nonvolatile memory means for accessing and transferring data into and out of said volatile memory means to and from said host computer system and to and from said nonvolatile memory means, said memory access control means requiring electric power for said accessing and transferring data;

main power supply means for supplying electric power from an external electric power source to said volatile memory means, to said nonvolatile memory means, and to said memory access control means;

reserve power supply means having a limited electric power source that is capable of supplying a limited amount of electric power to said volatile memory means, to said nonvolatile memory means, and to said memory access control means for respective limited times;

switch means connected to said main power supply means, to said reserve power supply means, to said volatile memory means, and to said memory access control means for selectively connecting either said main power supply means or said reserve power supply means to selected ones of said volatile memory means, said nonvolatile memory means, and said memory access control means; and supervisor circuit means connected to said main power supply means, to said reserve power supply means, to said switch means, and to said memory access control means for generating on-line main power mode signals to said switch means and to said memory access control means when said main power supply means is providing adequate electric power to operate both said volatile memory means and said memory access control means, for sensing when said main power supply means is not providing said adequate electric power and in response generating near on-line reserve power mode signals to said switch means and to said memory access control means, and for sensing when a time period has elapsed after generation of said near on-line reserve power mode signals and said main power supply means is still not providing said adequate electric power and in response generating back-up data transfer mode signals to said switch means and to said memory access control means;

said switch means being responsive to said on-line main power mode signals to connect said main power supply means to said volatile memory means and to said memory access control means, and said memory access control means being responsive to said on-line main power mode signals to facilitate transferring data into and out of said volatile memory means to and from said host computer system said main power supply means supplying a first level of electric power;

said switch means being responsive to said near on-line reserve power mode signals to maintain said connect of said reserve power supply means to said volatile memory means and to disconnect said reserve power supply means from said memory access control means said reserve power supply means supplying a second level of electric power which is less than said first level; and said switch means being responsive to said back-up data transfer mode signals to maintain said connect of said reserve power supply means to said volatile memory means, to reconnect said reserve power supply means to said memory access control means, and to connect said reserve power supply means to said nonvolatile memory means; said memory access means being responsive to said back-up data transfer mode signals to transfer data out of said volatile memory means to said nonvolatile memory means said reserve power supply means supplying a third level of electric power which is greater than said second level.

26. A data protection system for use with a host computer system, comprising:

volatile memory means for storing data, said volatile memory means requiring electric power to maintain data and for transferring data into and out of said volatile memory means;

nonvolatile memory means for storing data, said nonvolatile memory means requiring electric power for transferring data into and out of said nonvolatile memory means but capable of maintaining data without electric power;

memory access control means connected to said volatile memory means, to said host computer system, and to said nonvolatile memory means for accessing and transferring data into and out of said volatile memory means to and from said host computer system and to and from said nonvolatile memory means, said memory access control means requiring electric power for said accessing and transferring data;

main power supply means for supplying electric power from an external electric power source to said volatile memory means, to said nonvolatile memory means, and to said memory access control means;

reserve power supply means having a limited electric power source that is capable of supplying a limited amount of electric power to said volatile memory means, to said nonvolatile memory means, and to said memory access control means for respective limited times;

switch means connected to said main power supply means, to said reserve power supply means, to said volatile memory means, and to said memory access control means for selectively connecting either said main power supply means or said reserve power supply means to selected ones of said volatile memory means, said nonvolatile memory means, and said memory access control means;

supervisor circuit means connected to said main power supply means, to said reserve power supply means, to said switch means, and to said memory access control means for generating on-line main power mode signals to said switch means and to said memory access control means when said main power supply means is providing adequate electric power to operate both said volatile memory means and said memory access control means, for sensing when said main power supply means is not providing said adequate electric power and in response generating near on-line reserve power mode signals to said switch means and to said memory access control means, and for sensing when reserve power is depleted to an amount that can just safely execute a bulk transfer of data from said volatile memory to said nonvolatile memory after generation of said near on-line reserve power mode signals and said main power supply means is still not providing said adequate electric power and in response generating back-up data transfer mode signals to said switch means and to said memory access control means;

said switch means being responsive to said on-line main power mode signals to connect said main power supply means to said volatile memory means and to said memory access control means, and said memory access control means being responsive to said on-line main power mode signals to facilitate transferring data into and out of said volatile memory means to and from said host computer system said main power supply means supplying a first level of electric power;

said switch means being responsive to said near on-line reserve power mode signals to maintain said connect of said reserve power supply means to said volatile memory means and to disconnect said reserve power supply means from said memory access control means said reserve power supply means supplying a second level of electric power which is less than said first level; and said switch means being responsive to said back-up data transfer mode signals to maintain said connect of said reserve power supply means to said volatile memory means, to reconnect said reserve power supply means to said memory access control means, and to connect said reserve power supply means to said nonvolatile memory means, said memory access means being responsive to said back-up data transfer mode signals to transfer data out of said volatile memory means to said nonvolatile memory means said reserve power supply means supplying a third level of electric power which is greater than said second level.

* * * * *